(12) United States Patent
Hageman et al.

(10) Patent No.: US 9,338,018 B2
(45) Date of Patent: May 10, 2016

(54) SYSTEM AND METHOD FOR PRICING COMMUNICATION OF A TELECOMMUNICATION PLATFORM

(71) Applicant: Twilio, Inc., San Francisco, CA (US)

(72) Inventors: Robert Hageman, San Francisco, CA (US); Adam Ballai, San Francisco, CA (US); Timothy S. Milliron, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

(21) Appl. No.: 14/488,770

(22) Filed: Sep. 17, 2014

(65) Prior Publication Data

US 2015/0079927 A1    Mar. 19, 2015

Related U.S. Application Data

(60) Provisional application No. 61/879,016, filed on Sep. 17, 2013.

(51) Int. Cl.
*H04M 11/00* (2006.01)
*H04L 12/14* (2006.01)
*H04M 15/00* (2006.01)

(52) U.S. Cl.
CPC ........ *H04L 12/1421* (2013.01); *H04L 12/1403* (2013.01); *H04L 12/1485* (2013.01); *H04M 15/765* (2013.01); *H04M 15/80* (2013.01)

(58) Field of Classification Search
CPC ....................................................... H04W 4/24
USPC ......................................................... 455/406
See application file for complete search history.

(56) References Cited

U.S. PATENT DOCUMENTS

| | | | |
|---|---|---|---|
| 5,274,700 | A | 12/1993 | Gechter et al. |
| 5,526,416 | A | 6/1996 | Dezonno et al. |
| 5,581,608 | A | 12/1996 | Jreij et al. |
| 5,598,457 | A | 1/1997 | Foladare et al. |
| 6,026,440 | A | 2/2000 | Shrader et al. |
| 6,094,681 | A | 7/2000 | Shaffer et al. |
| 6,138,143 | A | 10/2000 | Gigliotti et al. |
| 6,185,565 | B1 | 2/2001 | Meubus et al. |
| 6,192,123 | B1 | 2/2001 | Grunsted et al. |
| 6,223,287 | B1 | 4/2001 | Douglas et al. |

(Continued)

FOREIGN PATENT DOCUMENTS

| | | |
|---|---|---|
| DE | 1684587 A | 3/1971 |
| EP | 0282126 A | 9/1988 |

(Continued)

OTHER PUBLICATIONS

RFC 3986: Uniform Resource Identifier (URI): Generic Syntax; T. Berners-Lee, R. Fielding, L. Masinter; Jan. 2005; The Internet Society.

(Continued)

*Primary Examiner* — Santiago Garcia
(74) *Attorney, Agent, or Firm* — Jeffrey Schox

(57) ABSTRACT

A system and method that include receiving a communication pricing query; mapping the communication pricing query to a billable item; resolving a price of a billable item within a set of hierarchically defined pricing models with sparse overrides, wherein each pricing model is defined for a set of billable items; and returning the price of the billable item in a response to the communication pricing query.

24 Claims, 10 Drawing Sheets

(56) References Cited

U.S. PATENT DOCUMENTS

| | | |
|---|---|---|
| 6,232,979 B1 | 5/2001 | Shochet |
| 6,269,336 B1 | 7/2001 | Ladd et al. |
| 6,317,137 B1 | 11/2001 | Rosasco |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Stroem et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Raesaenen |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,486,780 B2 | 2/2009 | Zirngibl et al. |
| 7,496,054 B2 | 2/2009 | Taylor |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,715,547 B2 | 5/2010 | Ibbotson et al. |
| 7,742,499 B1 | 6/2010 | Erskine et al. |
| 7,779,065 B2 | 8/2010 | Gupta et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,936,867 B1 | 5/2011 | Hill et al. |
| 7,962,644 B1 | 6/2011 | Ezerzer et al. |
| 7,979,555 B2 | 7/2011 | Rothstein et al. |
| 8,023,425 B2 | 9/2011 | Raleigh |
| 8,069,096 B1 * | 11/2011 | Ballaro et al. ............... 705/27.2 |

(56) References Cited

U.S. PATENT DOCUMENTS

| | | | |
|---|---|---|---|
| 8,081,958 B2 | 12/2011 | Soederstroem et al. |
| 8,103,725 B2 | 1/2012 | Gupta et al. |
| 8,126,128 B1 | 2/2012 | Hicks, III et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,185,619 B1 | 5/2012 | Maiocco et al. |
| 8,196,133 B2 | 6/2012 | Kakumani et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,266,327 B2 | 9/2012 | Kumar et al. |
| 8,295,272 B2 | 10/2012 | Boni et al. |
| 8,306,021 B2 | 11/2012 | Lawson et al. |
| 8,326,805 B1 | 12/2012 | Arous et al. |
| 8,346,630 B1 | 1/2013 | McKeown |
| 8,355,394 B2 | 1/2013 | Taylor et al. |
| 8,417,817 B1 | 4/2013 | Jacobs |
| 8,438,315 B1 | 5/2013 | Tao et al. |
| 8,462,670 B2 | 6/2013 | Chien et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,582,450 B1 | 11/2013 | Robesky |
| 8,594,626 B1 | 11/2013 | Woodson et al. |
| 8,611,338 B2 | 12/2013 | Lawson et al. |
| 8,613,102 B2 | 12/2013 | Nath |
| 8,649,268 B2 | 2/2014 | Lawson et al. |
| 8,667,056 B1 | 3/2014 | Proulx et al. |
| 8,675,493 B2 | 3/2014 | Buddhikot et al. |
| 8,755,376 B2 | 6/2014 | Lawson et al. |
| 8,806,024 B1 | 8/2014 | Francis et al. |
| 8,837,465 B2 | 9/2014 | Lawson et al. |
| 8,838,707 B2 | 9/2014 | Lawson et al. |
| 8,861,510 B1 | 10/2014 | Fritz |
| 8,964,726 B2 | 2/2015 | Lawson et al. |
| 9,014,664 B2 * | 4/2015 | Kim et al. | 455/408 |
| 9,015,702 B2 | 4/2015 | Bhat |
| 2001/0038624 A1 | 11/2001 | Greenberg et al. |
| 2001/0043684 A1 | 11/2001 | Guedalia et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0198941 A1 | 12/2002 | Gavrilescu et al. |
| 2003/0006137 A1 | 1/2003 | Wei et al. |
| 2003/0014665 A1 | 1/2003 | Anderson et al. |
| 2003/0018830 A1 | 1/2003 | Chen et al. |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097447 A1 | 5/2003 | Johnston |
| 2003/0103620 A1 | 6/2003 | Brown et al. |
| 2003/0123640 A1 | 7/2003 | Roelle et al. |
| 2003/0195990 A1 | 10/2003 | Greenblat |
| 2003/0196076 A1 | 10/2003 | Zabarski et al. |
| 2003/0211842 A1 | 11/2003 | Kempf et al. |
| 2003/0231647 A1 | 12/2003 | Petrovykh |
| 2004/0008635 A1 | 1/2004 | Nelson et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 * | 5/2004 | Reith et al. | 455/410 |
| 2004/0165569 A1 | 8/2004 | Sweatman et al. |
| 2004/0172482 A1 | 9/2004 | Weissman et al. |
| 2004/0205689 A1 | 10/2004 | Ellens et al. |
| 2004/0213400 A1 | 10/2004 | Golitsin et al. |
| 2004/0218748 A1 | 11/2004 | Fisher |
| 2004/0228469 A1 | 11/2004 | Andrews et al. |
| 2004/0240649 A1 | 12/2004 | Goel |
| 2005/0005200 A1 | 1/2005 | Matena et al. |
| 2005/0010483 A1 | 1/2005 | Ling |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0091572 A1 | 4/2005 | Gavrilescu et al. |
| 2005/0125251 A1 * | 6/2005 | Berger et al. | 705/1 |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008073 A1 | 1/2006 | Yoshizawa et al. |
| 2006/0015467 A1 | 1/2006 | Morken et al. |
| 2006/0047666 A1 | 3/2006 | Bedi et al. |
| 2006/0067506 A1 | 3/2006 | Flockhart et al. |
| 2006/0129638 A1 | 6/2006 | Deakin |
| 2006/0143007 A1 | 6/2006 | Koh et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0256816 A1 | 11/2006 | Yarlagadda et al. |
| 2006/0262915 A1 | 11/2006 | Marascio et al. |
| 2006/0270386 A1 * | 11/2006 | Yu et al. | 455/406 |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0050306 A1 | 3/2007 | McQueen |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0208862 A1 | 9/2007 | Fox et al. |
| 2007/0232284 A1 | 10/2007 | Mason et al. |
| 2007/0242626 A1 | 10/2007 | Altberg et al. |
| 2007/0265073 A1 | 11/2007 | Novi et al. |
| 2007/0286180 A1 | 12/2007 | Marquette et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0052395 A1 | 2/2008 | Wright et al. |
| 2008/0091843 A1 | 4/2008 | Kulkarni |

(56) References Cited

U.S. PATENT DOCUMENTS

| | | |
|---|---|---|
| 2008/0104348 A1 | 5/2008 | Kabzinski et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0177883 A1 | 7/2008 | Hanai et al. |
| 2008/0201426 A1 | 8/2008 | Darcie |
| 2008/0209050 A1 | 8/2008 | Li |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0232289 A1 | 9/2009 | Drucker et al. |
| 2009/0235349 A1 | 9/2009 | Lai et al. |
| 2009/0252159 A1 | 10/2009 | Lawson et al. |
| 2009/0276771 A1 | 11/2009 | Nickolov et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2010/0037204 A1 | 2/2010 | Lin et al. |
| 2010/0070424 A1 | 3/2010 | Monk |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0115041 A1 | 5/2010 | Hawkins et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0251329 A1 | 9/2010 | Wei |
| 2010/0251340 A1 | 9/2010 | Martin et al. |
| 2010/0281108 A1 | 11/2010 | Cohen |
| 2010/0291910 A1 | 11/2010 | Sanding et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |
| 2011/0251921 A1 | 10/2011 | Kassaei et al. |
| 2011/0255675 A1 | 10/2011 | Jasper et al. |
| 2011/0265172 A1 | 10/2011 | Sharma et al. |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0310902 A1 | 12/2011 | Xu |
| 2011/0320449 A1 | 12/2011 | Gudlavenkatasiva |
| 2011/0320550 A1 | 12/2011 | Lawson et al. |
| 2012/0011274 A1 | 1/2012 | Moreman |
| 2012/0017222 A1 | 1/2012 | May |
| 2012/0023544 A1 | 1/2012 | Li et al. |
| 2012/0028602 A1* | 2/2012 | Lisi et al. ................. 455/406 |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | VanSwol et al. |
| 2012/0089572 A1 | 4/2012 | Raichstein et al. |
| 2012/0094637 A1 | 4/2012 | Jeyaseelan et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0226579 A1 | 9/2012 | Ha et al. |
| 2012/0239757 A1 | 9/2012 | Firstenberg et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0047232 A1 | 2/2013 | Tuchman et al. |
| 2013/0054684 A1 | 2/2013 | Brazier et al. |
| 2013/0058262 A1 | 3/2013 | Parreira |
| 2013/0067448 A1 | 3/2013 | Sannidhanam et al. |
| 2013/0097298 A1 | 4/2013 | Ting et al. |
| 2013/0156024 A1 | 6/2013 | Burg |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2014/0064467 A1 | 3/2014 | Lawson et al. |
| 2014/0105372 A1 | 4/2014 | Nowack et al. |

(56) References Cited

U.S. PATENT DOCUMENTS

| | | |
|---|---|---|
| 2014/0106704 A1 | 4/2014 | Cooke et al. |
| 2014/0123187 A1 | 5/2014 | Reisman |
| 2014/0129363 A1* | 5/2014 | Lorah et al. ........... 705/26.1 |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0274086 A1 | 9/2014 | Boerjesson et al. |
| 2014/0282473 A1 | 9/2014 | Saraf et al. |
| 2014/0355600 A1 | 12/2014 | Lawson et al. |
| 2014/0379670 A1 | 12/2014 | Kuhr |
| 2015/0004932 A1* | 1/2015 | Kim et al. ............. 455/407 |
| 2015/0004933 A1* | 1/2015 | Kim et al. ............. 455/407 |
| 2015/0023251 A1 | 1/2015 | Giakoumelis et al. |
| 2015/0066865 A1 | 3/2015 | Yara et al. |
| 2015/0181631 A1 | 6/2015 | Lee et al. |

FOREIGN PATENT DOCUMENTS

| | | |
|---|---|---|
| EP | 1464418 A | 10/2004 |
| EP | 1522922 A2 | 4/2005 |
| EP | 1770586 A1 | 4/2007 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 02087804 | 11/2002 |
| WO | 2006037492 A | 4/2006 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

OTHER PUBLICATIONS

Complaint for Patent Infringement, *Telinit Technologies, LLC* v. *Twilio Inc.*, dated Oct. 12, 2012.
NPL, "API Monetization Platform", 2013.

\* cited by examiner

_US 9,338,018 B2_

SYSTEM AND METHOD FOR PRICING COMMUNICATION OF A TELECOMMUNICATION PLATFORM

CROSS-REFERENCE TO RELATED APPLICATIONS

This application claims the benefit of U.S. Provisional Application Ser. No. 61/879,016, filed on 17 Sep. 2013, which is incorporated in its entirety by this reference.

TECHNICAL FIELD

This invention relates generally to the telecommunication field, and more specifically to a new and useful system and method for pricing communication of a telecommunication platform in the telecommunication field.

BACKGROUND

Usage of a telecommunication infrastructure is accompanied by cost. Traditionally, end users were required to agree to contracts that locked the customer into a payment plan. Service providers additionally operate through contracts based on infrastructure and communication usage. In recent years, telecommunication platforms have emerged that integrate with internet based technologies allowing more interactive and application driven communications over channels such as PSTN, SMS, MMS, and the like. However, the contract-based ecosystem of telecommunication limits the way that such platforms can be offered. Thus, there is a need in the telecommunication field to create a new and useful system and method for pricing communications of a telecommunication platform. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Pricing Communication of a Telecommunication Platform

Figure 1:
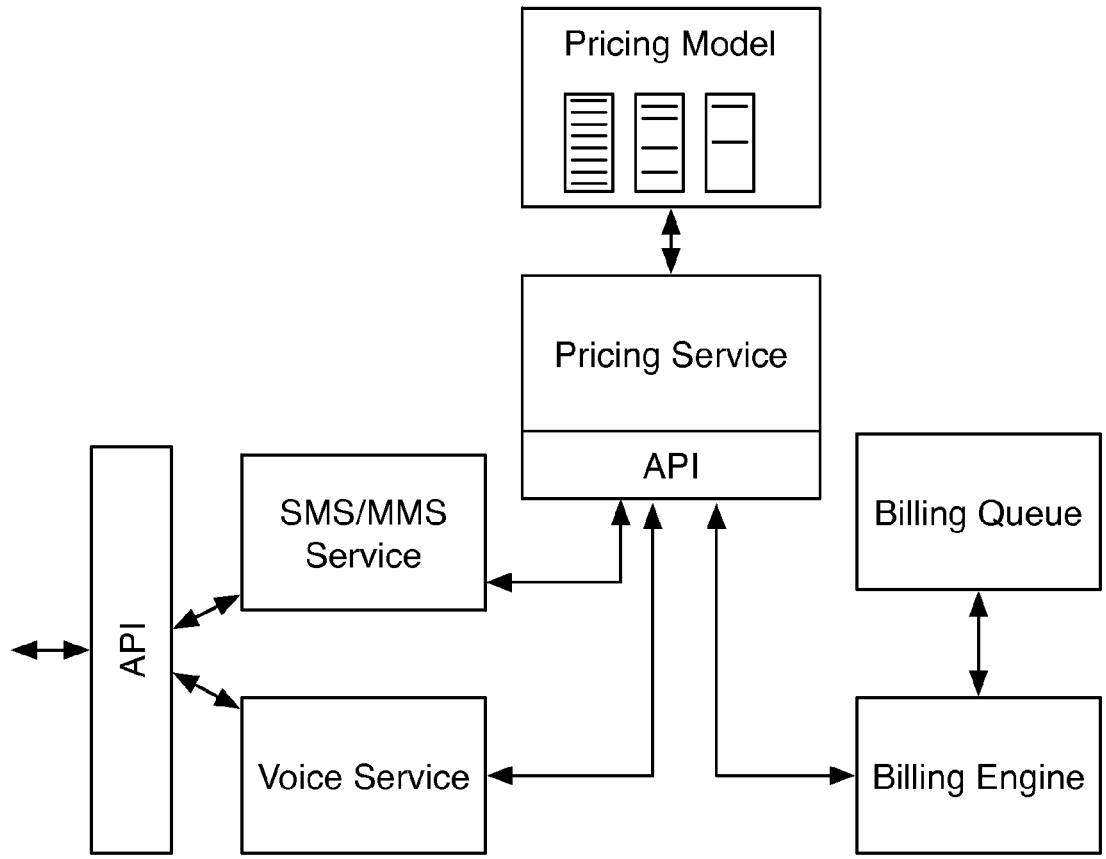
FIG. 1 is a schematic representation of a system for pricing communication of a preferred embodiment.

As shown in FIG. 1, a system for pricing communication of a telecommunication platform of a preferred embodiment includes a pricing application programming interface (API) 110, a platform pricing model 120, and a pricing engine. The system is preferably implemented within a multitenant telecommunication platform 100 such as the ones described in U.S. Pat. No. 8,306,021, filed 2 Apr. 2009 and U.S. Pat. No. 8,315,369, filed 2 Mar. 2010, which are both incorporated in their entirety by this reference. The system functions to facilitate representing numerous, complex, and changing contractual agreements across a variety of billable items within a telephony platform. The billable items can directly correlate to physical communication transactions and sessions occurring over a telephony or alternative communication network. The system improves the management and enforcement of pricing agreements across the telecommunication platform. While the system described is preferably implemented for a communication platform, which often deals with complex pricing depending on the properties of the communication and agreed upon plans, the system may similarly be applied to other pricing and metric applications where highly customizable accounting systems are implemented across a platform.

The telecommunication platform 100 of the preferred embodiment functions to provide a wide variety of communication channels to multiple entities. The telecommunication platform 100 can be any suitable type of communication platform. The platform is preferably multitenant. In other words, multiple users, customers, developers, companies preferably share use of the infrastructure of the platform. These accounts, their sub-accounts, groups of accounts (e.g., regional areas), and other segments within the platform can have different pricing agreements. As such, there may be multiple different pricing contracts that are configured for a sub-set of the communication on the platform. In some implementations, accounts may include sub-accounts. In many instances, an account used to implement an application is offered to a number of sub-accounts. In this situation, the pricing system can be used to offer customized pricing to the sub-account holders. Additionally, an account can manage multiple endpoints (e.g., telephone numbers, short codes, SIP addresses, or any suitable communication destination/origin point). A given endpoint can have different pricing characteristics based on the endpoint type, network, country, and other factors. Preferably, the telecommunication platform is a platform that enables software developers to configure account applications to programmatically make, receive, and interact with voice calls, video calls, text messages, media messages, and other forms of communication. The telecommunication platform can include capabilities to interface with the public switched telephone network (PSTN), short message service (SMS), multimedia messaging service (MMS), and/or session initiation protocol (SIP) based communication, but may additionally or alternatively interface with client applications proprietary communication protocols, or any suitable communication channel.

All the various options of who is making a communication, who is involved in the communication, what features are used during for the communication (e.g., recording, conference call, transcription, call waiting, communication tracking, high quality call setting, low quality call setting), what medium a communication, what carrier is used for the communication, and numerous other factors can be used to define different creditable item. A creditable item is preferably some item related to use of the platform for which some entity is credited. In a preferred implementation, the creditable item is a billable item for which an associated account holder of the platform is billed. However, in some situations a creditable item may have no association with billing and financial transactions. For example, if the platform is offered for free, then an account may have some allocated amount of "credit" for which different actions are deducted from this credit.

The telecommunication platform can additionally include an API to programmatically interact with the platform 100. The API may include various interface mechanisms to control various aspects of the communication platform such as making calls or sending messages, but the API preferably includes a set of interfaces that define the pricing API 110. Billing on the telecommunication platform 100 is preferably based on usage of the different communication options and platform features (e.g., conferencing, recording, speech-to-text conversion, queuing, and other features).

The pricing API 110 of the preferred embodiment functions as an interface for services of the platform to determine pricing of a billable item or event. The pricing API can include an interface to request a price for a creditable item and a pricing model interface to interact with the platform pricing model. The pricing API 110 is preferably implemented as a service API within the platform that other services can query. The pricing API 110 may additionally be integrated within a billing engine so that prices can be accounted for when managing bills of accounts and/or subaccounts. The pricing API is preferably a RESTful API but may alternatively be any suitable API such as SOAP. The API preferably works according to an HTTP request and response model. HTTP requests (or any suitable request communication) to the communication platform preferably observe the principles of a RESTful design. RESTful is understood in this document to describe a Representational State Transfer architecture as is known in the art. The pricing API 110 preferably includes calls to specify the type of communication in question. In reply to the query, a response is generated with the price. In one usage mode, the pricing API is used to preemptively query prices prior to executing an action. Cost of an action may be highly variable depending on the properties of the communication, and the pricing API no enables actions to be modified according to the cost. In one example, a communication service may query to determine the price of sending a message prior to sending. Price querying can be used internally or alternatively, the pricing API may be exposed externally to outside developers (e.g., account holders). In another usage mode, the pricing API is used for accounting of executed actions, which is often used by a billing engine to determine the bill for an account. The pricing API preferably is the access mechanism of the pricing engine, which processes a pricing model. The pricing engine is preferably configured for evaluating a query and appropriately applying the pricing model to the query.

The pricing API 110 can additionally include an interface for defining and updating the platform pricing model 120. Preferably administrators of the communication platform can update a pricing model. In another variation, when a user signs up they may select from different usage plans or customize a usage plan, in which case a pricing model targeted at that account usage can be automatically set through the pricing API. The platform pricing model 120 is preferably a mutable object, which functions to allow for flexible and dynamic updates to the pricing. This may be beneficial in giving the communication platform the flexibility to negotiate with different customers and service providers to define targeted service offerings. Using the pricing API 110 different elements of the platform pricing model 120 (root pricing models, currency pricing models, other sub-models) to be created, edited, or deleted (i.e., mutated) at any suitable instant, which allows the platform pricing model to evolve and change over time.

Figure 2:
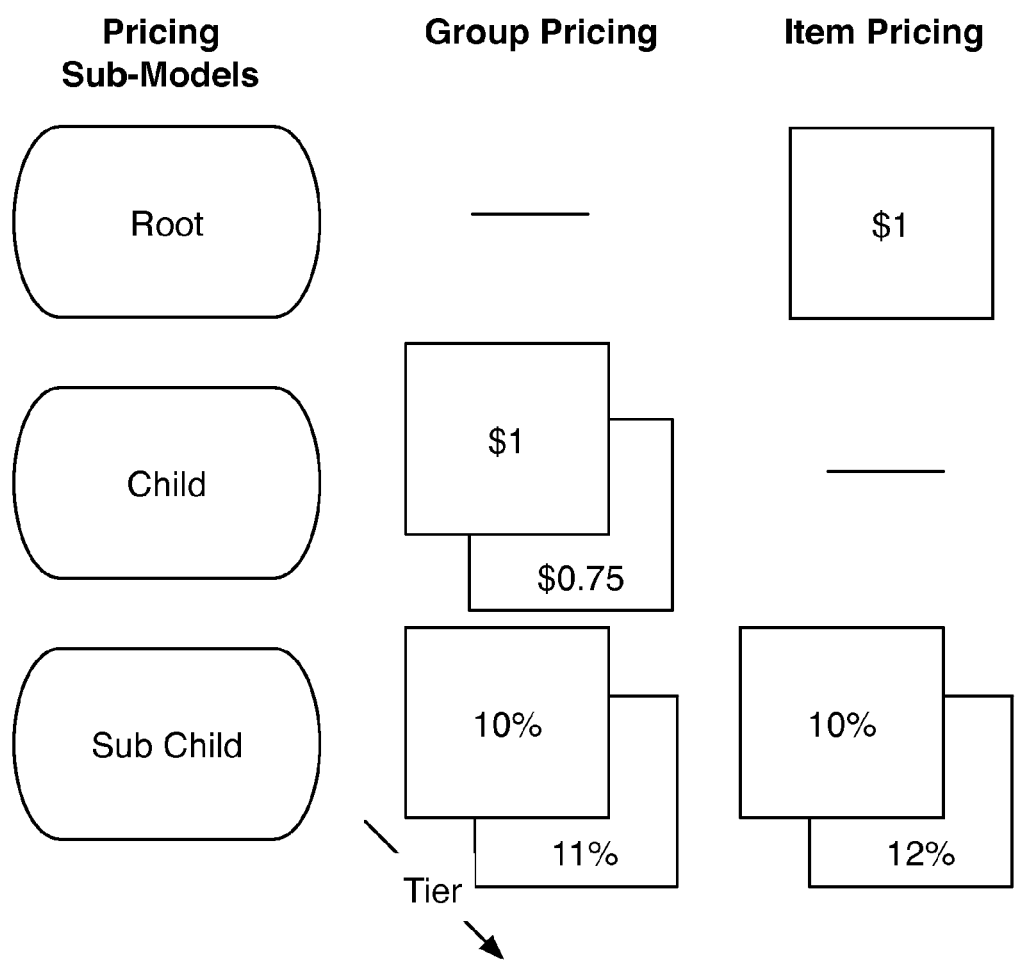
FIG. 2 is a diagram representation of the pricing model of a preferred embodiment.

The platform pricing model 120 of the preferred embodiment functions as a set of data objects that define pricing for billable items through various scopes. The platform pricing model 120 is preferably a set of individual pricing models that define customized pricing for various billable items. The platform pricing model 120 preferably includes a set of root pricing models that define pricing for a full set of creditable items (i.e., billable items) within the communication platform and a set of sub-models that override at least a portion of a root pricing sub-model and depend on at least one parent pricing model. The platform pricing model 120 enables prices to be defined for different forms of communication, destinations, origin addresses, durations or size of communication, carriers or routing options, mediums of communication, volumes or rates of communication, accounts and account levels, promotions and marketing offers, and/or other suitable properties of a communication. The platform pricing model 120 is preferably a set of ordered sub-models configured with sparse overrides that define prices of billable items within the platform as shown in FIG. 2. The pricing models within the platform pricing model 120 are preferably hierarchical in that there can exist a parent child relationship, wherein a child pricing model (a sub-model for a more specific pricing model) depends from one or more parent pricing model. A root pricing model is preferably base of the hierarchy. The pricing model includes at least two sub-models and can include any suitable number of sub-models. The sub-models are preferably ordered in a parent-child class organization such that a child model can override defined pricing of the parent model. The sub-models are preferably defined with relative priority such that when evaluating base prices and discounts, the pricing engine consistently processes the models in a defined and predictable manner. A root pricing model is preferably the lowest priority pricing sub-model and defines a full set of billable items such that each billable item is defined by at least the root pricing model. The pricing models dependent on the root pricing model are defined by child pricing models, which can sparsely define price overrides. Sparse overrides are price definitions for a subset of the full set of billable items or groups of billable items. If a child-model does not define a price of a particular billable item or a group of billable items, then the next sub-model is referenced until a price is determined, which ultimately can occur at the root pricing model. The sub-models preferably include price definitions which determine how to a price and/or discounted for a particular item.

The set of pricing models preferably include a root pricing model. The root pricing model is the highest level parent of child pricing model and functions as the default or base pricing model. As the default pricing model, the root pricing model does not inherit or override another sub-model. All sub-models are preferably child sub-models that override the root model (or override a sub-model that inherits from the root pricing model). If a child pricing model does not define pricing of a billable item, the pricing engine will arrive at the root pricing model and use the defined pricing. The root pricing model preferably defines the default pricing for the full set of billable items. The full set of billable items preferably includes all accountable events and items. Furthermore, the full set is defined across all SKU groups and variations of types of communication. The platform pricing model 120 may define its application to all billable items by defining base billable item categories. For example, the platform pricing model 120 may include a fixed price for PSTN phone calls, SMS messages, and MMS messages. In this example, sub-models may define targeted pricing models that are more targeted for a particular billable item such as a phone call made in the US, a MMS sent to a particular destination, or communications for a particular account made at a particular time of day. In one variation the root pricing model includes a single sub-model that is defined for all billable items. In another variation, the root pricing model can include a set of sub-models without any pricing model dependency but that as a set collectively define default pricing for the full set of billable times. In other alternative embodiments, the default pricing may be a dynamic or algorithmically generated value that functions as the root pricing model. The root pricing model is preferably defined for a single currency (i.e., the root currency), but the root pricing model can alternatively be defined for multiple currencies.

The set of sub-models additionally includes child pricing models that function to sparsely override pricing defined by parent pricing models. The child pricing models are preferably defined for subsets of the accounts of the telecommunication platform and/or different classifications of usage for which pricing differs from a default pricing of the root pricing model. The pricing sub-models function to enable contracts to be flexibly crafted specifically for different classes of users or service models. Accounts of the telecommunication platform, sub-accounts of those accounts, carriers, service provides, and other entities may have child pricing models defined. The child pricing models enable specialized pricing and discounts to be offered to select entities.

Additionally, a sub-model can be modeled as two classes of pricing sub-models: a group pricing model and an item pricing model. Each sub-model preferably targets a particular scope of communications such as countries, carriers, accounts, and the like. Within these scopes, the group and item pricing models make price definitions easier to maintain. An item pricing sub-model includes price definitions for individual billable items. Price definitions within an item pricing sub-model enable a high level of granularity in crafting pricing contracts. The group pricing sub-model functions as a convenient mechanism for defining price definitions that apply to a set of different billable items. A price definition within the group sub-model can be applied to SKU groups, a range of endpoints, to a set of different carriers, to multiple regions. Instead of individually assigning the price definitions of each related billable item, a single price definition is set. This can simplify the management of the pricing models when a single price definition can be altered to update multiple billable item prices—this while not sacrificing the capability of high granularity. The item pricing sub-model is of higher priority than corresponding group pricing sub-model, and as such, the item pricing sub-model is resolved before referencing the group pricing sub-model. An item price definition can override a group price definition.

Price definitions function as the configuration of pricing a billable item (or a group of billable items). The price definition can enable fixed pricing, price discounts, and tiered pricing based on some metric. In one variation, a price definition may include a fixed price or be undefined. If a fixed price is encountered, that price rate is applied to the communication. For some situations, the fixed price is the per instance price of the billable item. While price herein is typically expressed in monetary values, the price can alternatively be indicative or expressed in terms of operational cost to support execution and functioning of a telecommunication platform. Implementing a telecommunication platform requires tremendous amount of resources of which many are supplemented or coupled to infrastructure or systems managed by various industries that results in communication cost, which can be communicated in terms of cost, usage metrics, number of channels/options, transactions, communication volume or any suitable metric. For example, a fixed price of $0.01 for an SMS billable item can indicate each SMS message sent is $0.01. More preferably, a price definition includes a quantity parameter and an increment parameter. The quantity parameter can define what is counted. For messages, a quantity of one will charge for each message. A quantity of five will only charge for every five messages. For voice calls, the quantity may be 60 seconds such that the fixed price is multiplied against the number of minutes. The increment quantity may define how accounting is measured or rounded. For voice calls, an increment quantity of 30 seconds will round to the nearest 30 seconds. The increment quantity may define rounding to the closest value, rounding down, or rounding up. In place of a fixed price, the price definition can include a discount price. A price definition may additionally include a minimum quantity parameter, which functions to define the minimum unit of charge for an action. If usage does not meet the minimum quantity parameter, then the usage is charged for that minimum value. For example, voice calls may be rounded-up to the nearest $10^{th}$ of a minute with a 30 second minimum. In this case, a 2-second call is charged at thirty seconds (the minimum was not bet), and a 32-second call is charged at 36 seconds. A discount price defines a change in the price relative to a parent fixed price. Thus, a pricing engine continues processing the pricing model until a fixed price is found and then applies the discount price. The discount price can be a percentage off or a fixed price discount. Additionally, a price definition may define pricing tiers. A pricing tier is a set of price definitions within a range of usage. As an example, a first price may be set for the first one thousand messages and a second price is used for messages after a thousand have been sent. Any suitable number of tiers can be configured. A tier will preferably include a fixed price or a discount price as well as a metric parameter and threshold parameter, which defines how the tier is applied. The metric parameter is the value measured to determine the tier. Metrics may include count, time, data transmission, account spending, age of account, or any suitable metric. A plurality of metrics may additionally be used such that more complicated thresholds can be implemented (e.g., threshold of one hundred messages or after account spends $20). The pricing engine may query an outside service to access the metric data. The threshold parameter is a condition that defines the bounds of what communications the price should be applied. Tiers preferably do not inherit discounts of other tiers. If a tier has a discount price, the next concrete price of a parent model is used with the discount price.

In one example, a customer of the telecommunication service may negotiate a contract with the telecommunication platform provider for better rates on particular types of communications. A child pricing model can be defined for the account of that customer that includes overrides that specify that text messages to United States, Canada, and the UK get a special rate and that voice calls originating from Japan get a discount when made to these countries. Thus, the sparse overrides allow considerable flexibility in negotiating complicated contracts, and furthermore, the contract can be added to the system quickly without impacting other contracts.

Figure 3:
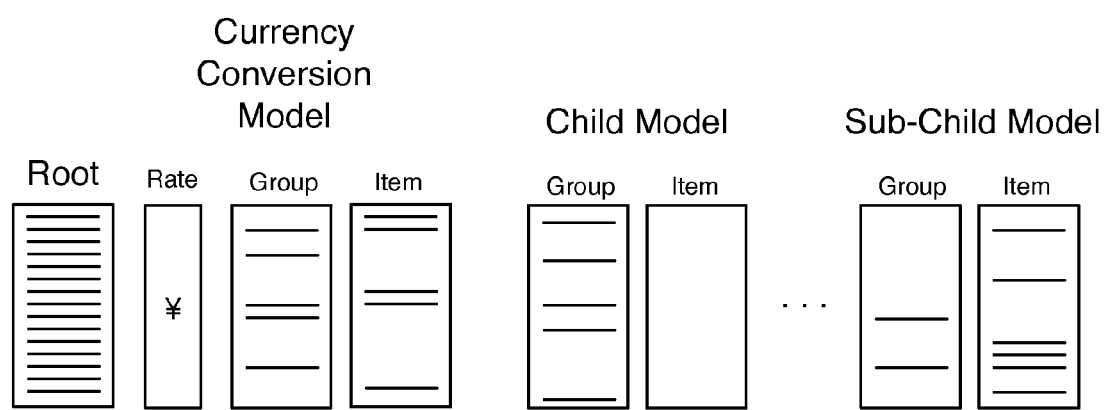
FIG. 3 is a schematic representation of a variation of a pricing model with a currency conversion model.

The pricing model can additionally include currency pricing models, which function as special child pricing models to convert between a root currency and a second currency. The currency pricing model preferably defines a currency price for a full set of billable items within that currency. The pricing model will include a root currency conversion factor that is applied to the root pricing model, which provides the root pricing of a given currency. The root currency conversion factor can be a value that converts between an original currency and a second currency. In one variation, the factor is a static value that is substantially fixed; however, the factor may be edited periodically either programmatically or through user input. The factor may alternatively be dynamically updated from an outside currency conversion source, which can be based on current exchange rates between currencies. The factor may alternatively include price setting rules to round up or down to defined values. For example, the pricing of a billable item may round to the closest integer value, powers of two, five, or ten. Additionally, the currency pricing model includes a sparse override currency model. Particular groups or individual billable items can be overridden such that custom pricing can be set that doesn't strictly follow the conversion factor. Currency pricing overrides can be used to provide "vanity" pricing (i.e., pricing that fit into common price setting values like $0.99, €1.99, and the like). The sparse override currency model is preferably substantially similar to other child models used in sparsely overriding the root model or a parent model. Child models for a defined currency preferably inherit from the appropriate currency pricing model. As shown in FIG. 3, a child model will preferably be defined for yen. This child model will inherit pricing from a currency pricing model, which includes a sparse override currency model and a conversion factor. The pricing model is a child of the root pricing model set in dollars in this example.

The pricing engine of the preferred embodiment functions to evaluate a query of the pricing API according to the billing item and generating a price. The pricing engine is preferably configured to step through sub-models of the pricing model until the price is resolved. The pricing engine will preferably start with the lowest child pricing model (e.g., the one most specific for the particular item). For example, if the billable item is for a particular account, then the pricing model of that account is evaluated first, if it exists. If the billable item is for a particular sub-account of the account, then the pricing model of that sub-account is preferably evaluated. If a fixed price is not determined, the pricing engine then proceeds to the next lowest pricing model. This continues until a discrete price is determined. As discussed above, a fixed price will resolve that price. A discounted price can apply a discount on a price resolved from a parent sub-model (the second most specific pricing sub-model). A tiered price definition calculates the price based on usage. Any suitable of data model search algorithm may be used to identify an appropriate pricing sub-model for a particular billable item. A discrete price will eventually be resolved since the root pricing model defines a price for the full set of billable items.

2. Method for Pricing Communication of a Telecommunication Platform

Figure 4:
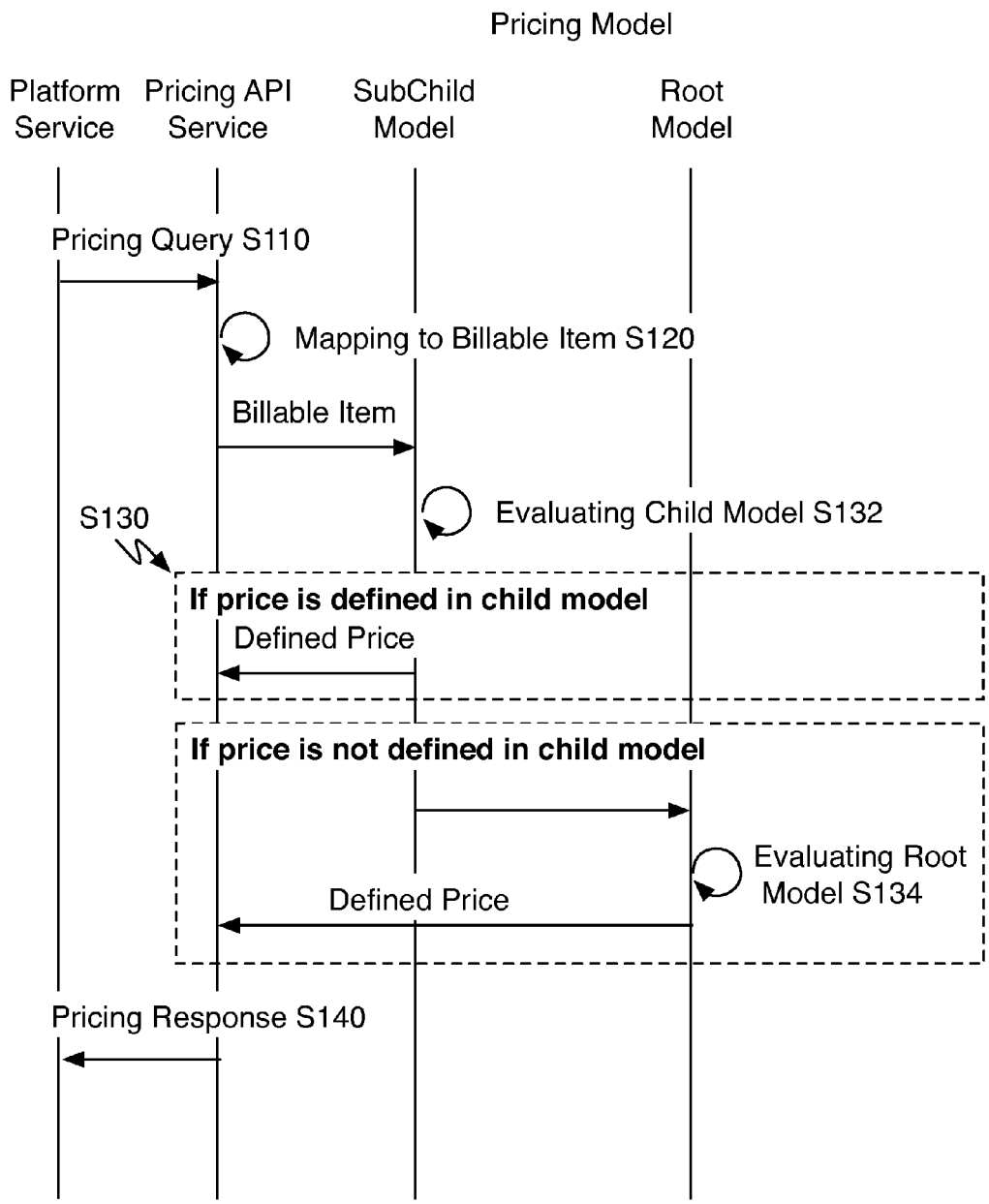
FIG. 4 is a communication flowchart of a method for pricing communication of a preferred embodiment.

As shown in FIG. 4, a method for pricing communication of a telecommunication platform of a preferred embodiment can include receiving a communication pricing query S110, mapping the communication pricing query to a billable item S120, resolving a price of a billable item within a set of pricing models S130, and returning the price of a billable item in a response S140. The method functions to evaluate a price measurement for a billable item or event. The method is preferably implemented within a system substantially similar to the one described above but may alternatively be used in any suitable system. The method preferably utilizes a platform pricing model that includes a hierarchical structured set of pricing sub-models that depend from one or more root pricing model. The creation and use of the platform pricing model can enable sub-models to define sparse over-rides of higher-level, base pricing for one or more billable items.

When applied within a telecommunication platform, the method can enable various billing arrangements and contracts to be represented within manageable system. The telecommunication platform will preferably bill for usage rather than fixed long term plans. This can enable accounts to easily scale their usage. Accounts may negotiate special pricing for different forms of usage. Since a telecommunications platform may require negotiating and renegotiating contracts with carriers and other forms of service providers as well as enterprise/large customers, the method provides a substantially flexible approach to adapting pricing for different entities. Similarly, some accounts may be given certain special pricing due to promotions, marketing, or business development efforts. Additionally, the telecommunication platform will have numerous forms of communications that leverage various outside services, networks, carriers, and other third party entities. With communication being a highly variable item, the price and cost of any given communication can vary greatly depending on properties such as the involved endpoints and the properties of the communication. The method can function to accommodate all this variability in a flexible and maintainable manner.

Figure 8:
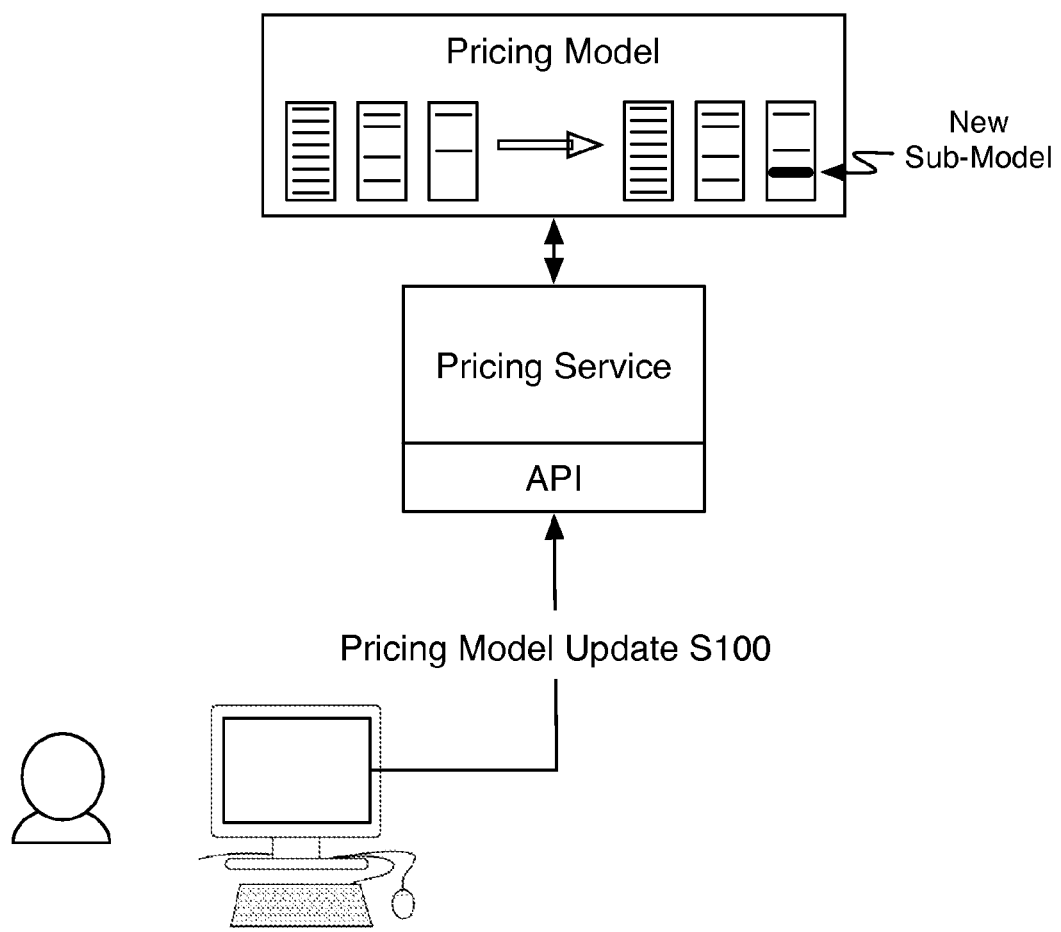
FIG. 8 is a schematic representation of defining a pricing model.

The method preferably includes defining a platform pricing model S100, which functions to generate a data model that defines pricing resolution. Defining a platform pricing model can additionally function to augment the pricing model of the platform as shown in FIG. 8. Defining the pricing model can include adding/removing a new pricing sub-model, editing price definitions of the model, and/or changing the targeting of a group.

The pricing model is preferably defined through a pricing model interface. The pricing model interface can be an API through which the pricing model may be augmented or queried programmatically. The API may be used internally. Pricing models can be automatically augmented based on different platform events and state. Similarly, information from the pricing model may be used in operational decisions of the platform. Additionally or alternatively, all or a portion of the API may be exposed to outside entities, which can enable outside developers to integrate programmatically with a pricing sub-model. In one variation, developer accounts can be granted API access to programmatically augment a portion of the pricing model. For example, an account could be granted right to create and augment child models for sub-accounts of the account.

The pricing model interface may alternatively or additionally include a graphical user interface that can function as a control panel for an administrator of pricing within the platform. The user interface preferably provides interface tools for viewing the current state of the pricing model, editing existing configuration of the pricing model, adding child models, removing child models, re-prioritizing child models, updating currency conversion, and other actions to manipulate the pricing model. The user interface can additionally include tools to query the pricing API for different communications, which can be used in testing, customer support, and other applications. Users/administrators can be granted permissions to augment various portions of the pricing model. For example, a customer support user may only be able to augment account pricing models. While, a pricing administrator may be granted to augment the root pricing models and currency conversion pricing models. In one example, a user interface can allow an administrator to select to create a new pricing model. The user then defines a billable item (or group of billable items) that is targeted. Then the user can add a price definition. A preview interface may display a list of pricing results for matching billable items with different usage properties (for example, showing pricing for phone calls 1 minute long, 5 minutes and 10 minutes in length in a preview menu). In one variation, multiple pricing sub-models may be generated through a single user interface. For example, if special pricing is being generated for a particular account, then pricing-models for voice calls, SMS, and MMS may be defined within a unified interface. In this variation, the billable item is defined by inheriting different contexts. The parent billable item context is the account which is added to the three billable items: one for voice calls by the account, one for SMS messages by the account, and one for MMS messages by the account. The platform pricing model can alternatively be defined using any suitable interface.

Figure 10:
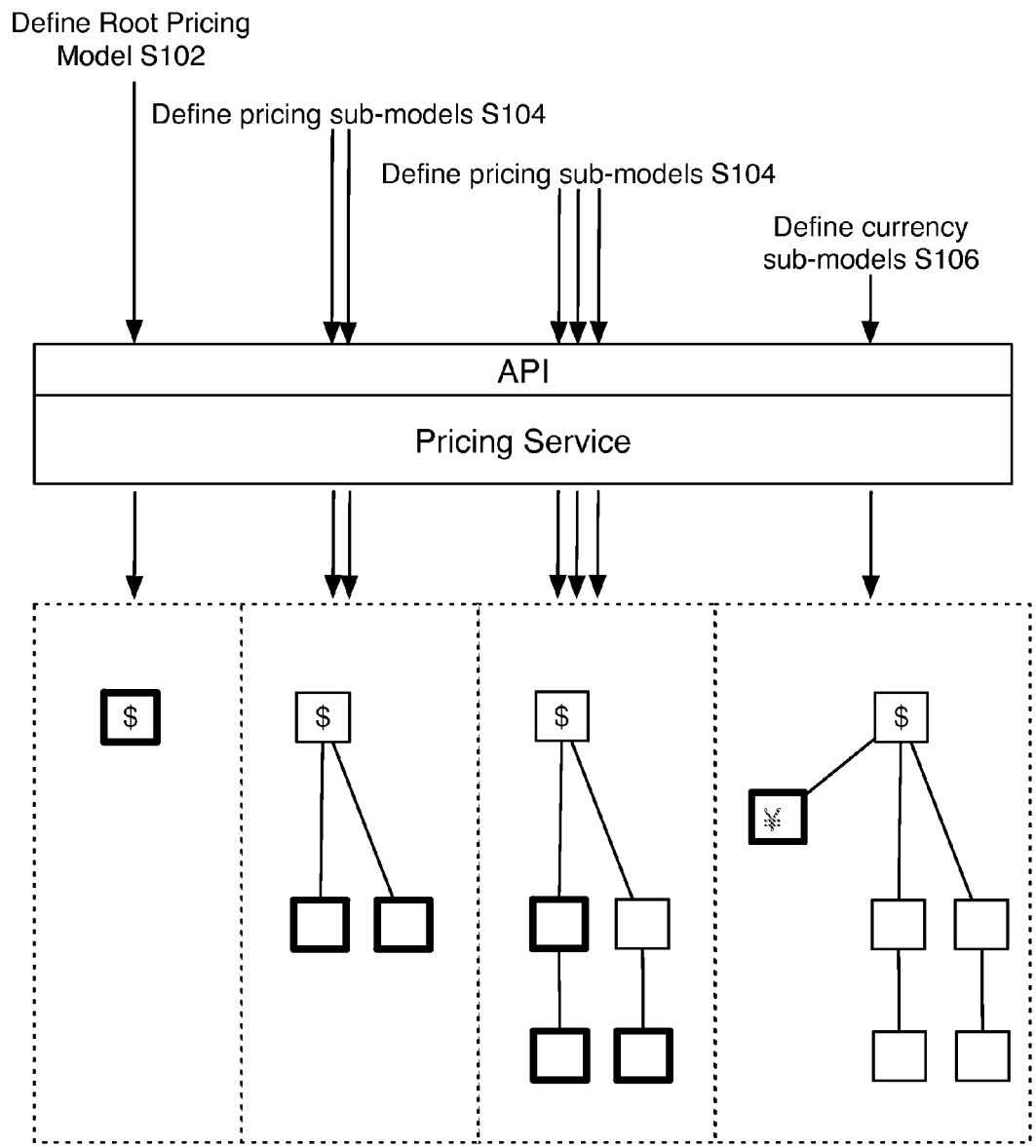
FIG. 10 is a schematic representation of defining a root pricing model, pricing sub-model, and a currency pricing model.

The platform pricing model is preferably a hierarchical structure of a set of pricing models. The platform pricing model preferably defines pricing for a full set of billable items within the platform. It can be appreciated that some items may be billed with prices defined outside of the method, while still using the model for the set of billable items to which the method is a desired approach. Defining a platform pricing model preferably includes setting a root pricing model for the set of billable items within the platform S102 and setting a pricing a set of pricing sub-models that sparsely over-ride at least a portion of the root pricing model for a subset of billable items in the platform S104 as shown in FIG. 10. The root pricing model and the pricing sub-models can include setting individual pricing models at distinct instances. For example, a first pricing model (e.g., a pricing model defined for calls over a first carrier) can be defined at a first instance, and a second pricing model (e.g., a pricing model defined for calls by a second carrier) can be defined at a second instance (e.g., a month after the first instance). The sequence of defining a platform pricing model can have any suitable order or timing. The root pricing model is preferably defined initially, but any pricing sub-model can be updated at any suitable time independent of hierarchical position.

The root pricing model preferably defines the pricing for the full set of billable items. In one variation, there is a single sub-model that defines the root pricing model. In another variation, multiple root sub-models are used in combination to define pricing for the full set of billable items. For example, the root pricing model may include a root pricing sub-model that sets the default pricing for voice calls, a root pricing sub-model that sets the default pricing for SMS messages, and a root pricing sub-model that sets the default pricing for MMS messages. Any billable time that does not have a more targeted pricing sub-model can preferably be resolved by the root pricing model.

The pricing sub-models preferably include sub-models that are specifically set to over-ride the price definition for one or more billable item. The pricing sub-models can depend from the root pricing model, but can additionally depend from a higher pricing sub-model. For example, a first pricing sub-model may define specific pricing for voice calls on a first carrier, but then a more targeted child sub-model may depend on the first pricing sub-model and override the price definition for a particular set of endpoints of that first carrier (e.g., a billable item defined by carrier and endpoints). In other words, the billable item of the second pricing sub-model is included in the set of billable items of the first pricing sub-model. However, as the second pricing model structured as a more targeted sub-model (is a child of the first sub-model), the second pricing model takes initial precedence during resolution of a price for that billable item. A pricing sub-model preferably includes a billable item parameter, which defines what items it targets. Different properties of a billable event can be used to create targeted pricing. For example, for a given communication there may be an origin endpoint (e.g., the caller), a destination endpoint (e.g., the callee), a communication mode (e.g., voice, SMS, MMS, SIP, IP messaging, video, screensharing, etc.), features (e.g., recording, conferencing, text-to-speech, speech-to-text, media analysis, call waiting, etc.), duration, service provider (e.g., telephone carrier used in terminating call), location, account(s), and/or any suitable property. For example, a billable item can be defined by a specified communication mode, a caller communication endpoint, and a callee communication endpoint. Pricing sub-models additionally include price definition, which is a value or function that is used in generating the price or quote. The pricing definition can be a fixed price, a discount price, a tired pricing function, or any suitable pricing function.

Additionally, defining the platform pricing model can include setting a currency sub-model that defines a full set of billable items in a second currency S106 as shown in FIG. 10. A currency sub-model can function as a root pricing model for pricing within a particular function. A currency pricing sub-model may include a pricing definition which is a function of a pricing sub-model in a different currency. Preferably, the currency pricing sub-model will depend on the root pricing model and will include at least one currency sub-model that translates from the first currency to the second. In this way, all billable items can be resolved into the second currency. The currency sub-model can additionally define a pricing definition function that rounds prices in the second currency to specific value patterns, which can enable automatic "vanity" prices in a different currency. From the currency sub-model additional pricing sub-models can be defined that over-ride billable items in that currency. Any number of currency pricing models can be defined to support any number of currencies.

Block S110, which includes receiving a communication pricing query, functions to initialize price calculation at a pricing service. The communication pricing query preferably specifies communication information. The communication information is a receipt, characterization, or property list of distinguishing attributes of a communication executable by the platform. The communication information can be for completed communication, an in-progress communication, or a pending/potential communication. The communication information preferably includes at least the originating endpoint, the destination endpoint(s), the medium of communication, and optionally characterizations of the communicated content. The endpoints include phone numbers, short codes, SIP addresses, usernames/ids, or other communicative addresses. The mediums of communication can include voice calls (e.g., PSTN phone calls, SIP calls, and the like), messaging (e.g., SMS, MMS, client application messaging, email, fax, and the like), video calls, screen sharing, and other forms of communication. The communicated content can include the media or message to be communicated, the size of the message, the duration of a call, the priority of the message (e.g., send whenever vs. send immediately), the time of the message, and other suitable properties.

In a first scenario, the communication pricing query originates from a communication service of the telecommunication platform. A voice service (which manages and processing voice calls) or a messaging service (which manages and processes message communication). Other services such as a video services, email services, fax services, screen sharing services and other suitable services can be additionally interface with the pricing service. In one variation, the query may be used in selecting a routing option of a particular communication. For example, multiple communication pricing queries may be made specifying different routing variations of a communication (e.g., sending over different protocols, using different carrier networks, etc.). The pricing results may be used by the communication service to select the cheapest routing option.

In a second scenario, the communication pricing query originates from a billing engine that is accounting for usage for a particular account/sub-account. When a bill for an account is being processed, the billable items accumulated by the account can be added to a billing queue. The billing queue can be a shared queue of items that are awaiting pricing information. A billing engine when available dequeues the billable items and submits a communication pricing query to the pricing API.

Block S120, which includes mapping the communication pricing query to a billable item, functions to determine the properties that would define the communication within the billing engine. Mapping the query preferably includes accessing endpoint information. An endpoint information service provides information about the involved endpoints. The endpoint information service preferably collects and manages detailed information about endpoints. Carrier/network information and country of the destination/origin endpoint is preferably provided through this service. Different forms of communication may depend on different properties, and thus only the required information for the communication in question may be accessed. In the case of SMS, country destination can determine price. In another variation country and carrier for SMS can be used. For example, a mobile country code (MCC) and a mobile network code (MNC) may be used as a key for identifying a billable messaging item. In the case of voice calls, country and carrier can determine price. Other endpoint information can additionally be used such as area code, phone number type (e.g., business, mobile, home, etc.), communication history of endpoint, if endpoint has a client application installed, presence information of the endpoint (e.g., is the user currently available), and other suitable forms information.

Figure 5:
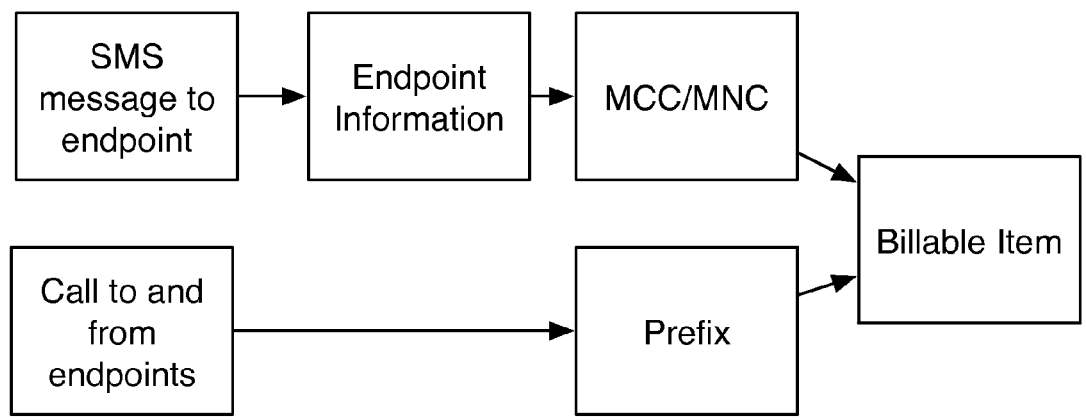
FIG. 5 is a schematic representation of deriving a billable item.

The endpoint information can be used to select or derive a billable item as shown in FIG. 5. A billable item defines the properties of the event or item that is accountable. In one variation, country code is accessed, and then the network code is accessed. This information can be used to generate, populate, or retrieve an appropriate billable item. A billable item is a characterization of a billable item. For example, an SMS message sent from a US area code A to a US area code B could be one exemplary billable item. A billable item can include the medium of communication, the endpoints, the carrier, the size or duration of the communication, the content of the communication, and other suitable properties. The medium of communication can include PSTN, SIP, alternative synchronous communication, SMS, MMS, push notification, client application communication, proprietary messaging, or other forms of communication. The billable item may additionally or alternatively specify networks, area codes, country codes, and other properties.

Block S130, which includes resolving price of a billable item within a set of pricing models functions to identify a price for the billable item. As described above, a pricing model is preferably a set of sub-models that define prices within various scopes. In one preferred implementation, there is one root pricing model, which is a sub-model scoped to define the default price of a billable item if no other sub-model defines the price. The root pricing model defines a price for the full set of billable items such that any billable item has determinable price. The other sub-models (i.e., child models) are preferably sparsely defined models that selectively override pricing of parent sub-models. Any sub model can inherit from the root pricing model, and they are able to override what they need or override a group of what they need. The child models can be nested so pricing models can additionally inherit from other pricing sub-models and in effect create a hierarchy of sparsely defined pricing sub-models.

Figure 6A:
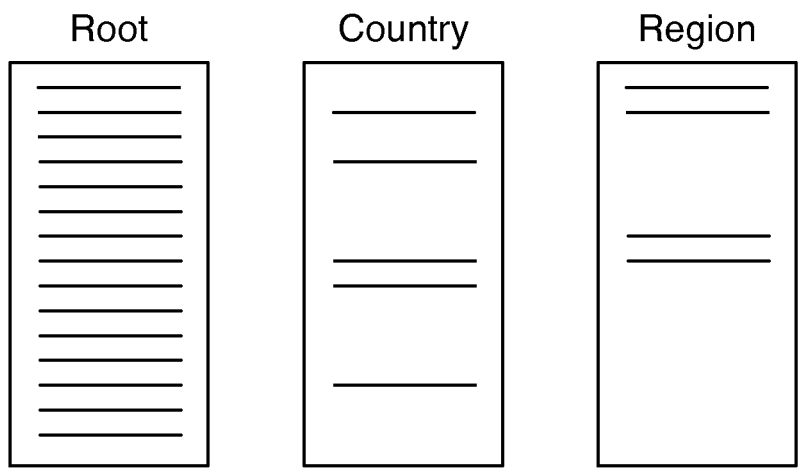
FIGS. 6A and 6B are exemplary representations of varying pricing sub-model scope.
Figure 6B:
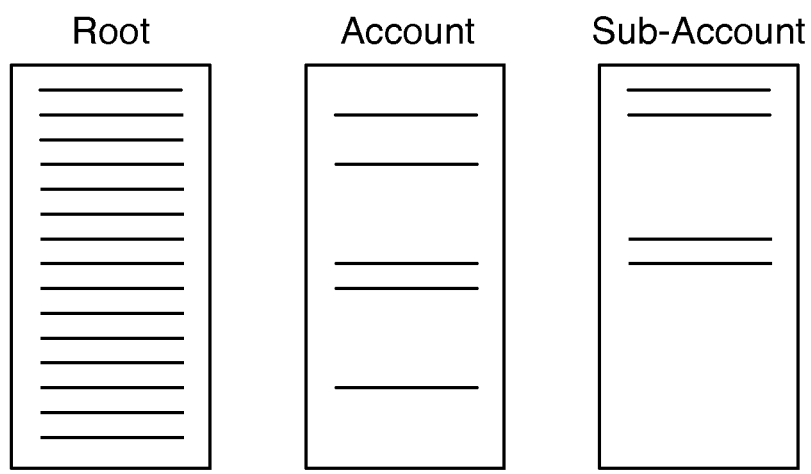
Figure 7:
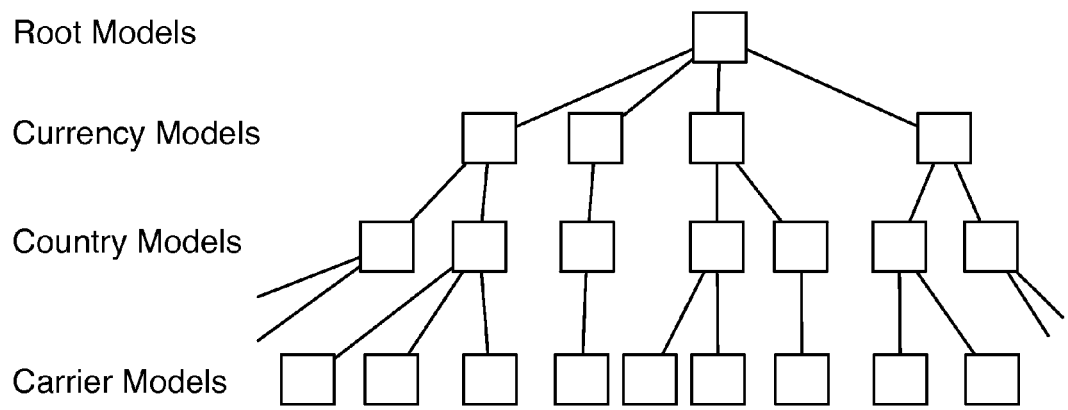
FIG. 7 is a schematic representation of the hierarchical structure of sub-models of a pricing model.

Sparsely defined models may include only a sub-set of the billable items, which may be an empty set. A price definition within a sub-model will override or take precedence over a price definition of the root model and any intermediate parent models. The child models can alternatively subclass or inherit pricing of other sub-models. The child models can be defined for different scopes, which are selectively applied to a billable item based on the properties of the billable item in question. The child models have a priority such that a pricing engine will resolve a price by evaluating the sub models in the order of their priority until a price is resolved. In other words, resolving a price will involve moving up through a hierarchy of price models. As the pricing models are associated with different scopes, this can be used to enable pricing to be customized and targeted. The child model scopes may be associated with country, area code, carriers, sub-set of customers (e.g., free account, premium account, business account, etc.), specific accounts, sub-accounts of accounts, and other suitable scope categories. As shown in FIG. 6A, child models can include geographic price customization by enabling country and region scopes. As shown in FIG. 6B, child models can include account level customization by enabling account child models and sub-account child models. An exemplary order of child pricing model order can be sub-account, account, region, country, and carrier. As shown in FIG. 3, this may additionally include currency conversion models that precede the root pricing model. Various child models are preferably defined and only a subset will be relevant to any billable item. For example, a child model for a first account will not be used for a second account. The set of sub-models can form a hierarchical tree of which the relevant sub-models are used when evaluating any billable item as shown in FIG. 7. When resolving the billable item, a billing engine preferably progresses up the hierarchy of pricing models (from child to parent towards the root). The pricing engine escapes the pricing resolving process when the price is determined. Alternatively, there may be no implicit hierarchical linked connection between pricing sub-models. Instead, the sub-models are preferably indexed according to billable item properties, and resolving a price of a billable item comprises querying the pricing sub-models within the platform pricing model. The pricing sub-model that most closely defines the billable item is used in calculating a quote or price. Higher level price definitions (which are more general in their targeting) have less priority than price definition of the lower level pricing models (which have higher priority and are evaluated before moving to the next highest priority pricing model). Additionally or alternatively, different billable item property types may have different priority when determining which pricing sub-model takes precedence. For example, a carrier billable item property may be higher level and therefore less priority than an endpoint billable item property. So a pricing sub-model for an endpoint will be used over a pricing sub-model for a carrier.

Resolving price of a billable item includes evaluating price definition within a child pricing model S132, and if pricing is not defined within a child pricing model, evaluating price definition of a root pricing model S134. Evaluating price definition within the child pricing model functions to evaluate the highest priority child-model for the particular billable item. A child pricing model may be defined for accounts, sub-accounts, countries, geographical regions, classes of endpoints (e.g., phone numbers or endpoints associated with a specific carrier or service provider), and other suitable categories. Evaluating the child model will include checking if a price definition exists for the billable item and if it does, using that price definition, and if not, proceeding to the next highest priority sub model which may be the root model. A price definition for a billable item (or a group of billable items) will define how a price is set. The price definition can enable fixed pricing, price discounts, and tiered pricing based on some metric. In one variation, a price definition may include a fixed price or be undefined. If a fixed price is encountered, that price rate is applied to the communication. For some situations, the fixed price is the per instance price of the billable item. For example, a fixed price of $0.01 for an SMS billable item can indicate each SMS message sent is $0.01. More preferably, a price definition includes a quantity parameter and an increment parameter. The quantity parameter can define what is counted. For messages, a quantity of one will charge for each message. A quantity of five will only charge for every five messages. For voice calls, the quantity may be 60 seconds such that the fixed price is multiplied against the number of minutes. The increment quantity may define how accounting is measured or rounded. For voice calls, an increment quantity of 30 seconds will round to the nearest 30 seconds. The increment quantity may define rounding to the closest value, rounding down, or rounding up. In place of a fixed price, the price definition can include a discount price. A price definition may additionally include a minimum quantity parameter, which functions to define the minimum unit of charge for an action. If usage does not meet the minimum quantity parameter, then the usage is charged for that minimum value. For example, voice calls may be rounded-up to the nearest $10^{th}$ of a minute with a 30 second minimum. In this case, a 2-second call is charged at thirty seconds (the minimum was not bet), and a 32-second call is charged at 36 seconds. A discount price defines a change in the price relative to a parent fixed price. Thus, a pricing engine continues processing the pricing model until a fixed price is found and then applies the discount price. The discount price can be a percentage off or a fixed price discount. Additionally, a price definition may define pricing tiers. A pricing tier is a set of price definitions within a range of usage. As an example, a first price may be set for the first one thousand messages and a second price is used for messages after a thousand have been sent. Any suitable number of tiers can be configured. A tier will preferably include a fixed price or a discount price as well as a metric parameter and threshold parameter, which defines how the tier is applied. The metric parameter is the value measured to determine the tier. Metrics may include count, time, data transmission, account spending, age of account, or any suitable metric. A plurality of metrics may additionally be used such that more complicated thresholds can be implemented (e.g., threshold of one hundred messages or after account spends $20). The pricing engine may query an outside service to access the metric data. The threshold parameter is a condition that defines the bounds of what communications the price should be applied. Tiers preferably do not inherit discounts of other tiers. If a tier has a discount price, the next concrete price of a parent model is used with the discount price.

In one implementation, a child model includes two sub models, one an item pricing model and one a group pricing model. Evaluating price definition within a child pricing model can include evaluating an item pricing model and subsequently evaluating a group pricing model. The item pricing model includes price definitions for specific billable items. The item pricing model functions to provide high granularity in defining customized pricing. The group pricing model includes price definition for groups of billable items. The grouped billable items make it easier to create a single price definition that covers several billable items. For example, if a price definition needs to be applied to a block of endpoints, a price definition can be set in the group billable item that targets all the associated billable items as opposed to repeatedly setting the same price definition for each billable item individually. This functions to improve maintainability of the pricing models—it is easier to set and update in bulk.

If pricing is not defined after evaluating child pricing models, Block S130 includes evaluating price definition of a root pricing model, which functions to use a default price. The root pricing model is used if no child models included a price definition for the billable item or a group including the billable item. The root pricing model may alternatively be accessed if a discount price was defined in a child model but a fixed price was not identified when checking the higher level child models. The root pricing model preferably defines a fixed price for the full set of billable items. The price definitions can similarly be defined with an item pricing model and a group pricing model.

Additionally, resolving a price of a billable item can include evaluating price definition within a currency conversion model. Preferably, child models are defined within the expected currency. For example, a child model for Japanese calls will include price definitions specified in Yen. If a fixed price is identified within a child model, there is no need to convert currency. However, if the price resolving process proceeds to the root pricing model, then a currency conversion model is used. A currency conversion model can be similar to a child model in that an item pricing model and a group pricing model can be defined. Specific default prices can be set for the currency. This can be used to provide "vanity" prices that may be marketed as user appealing prices (e.g., 1¥). These are set to disregard strict currency conversion from the root pricing model. This, as for price definitions of child models above, can be sparsely defined. If a price definition is not defined in the currency conversion pricing model, a conversion factor is applied to the root pricing model. This can be a set conversion rate or be dynamically set to an exchange rate. Having all pricing depend from a master root pricing model can enable new features to be quickly pushed to production—only a single pricing model would require updating. An alternative approach can use a root pricing model defined for each currency.

Figure 9:
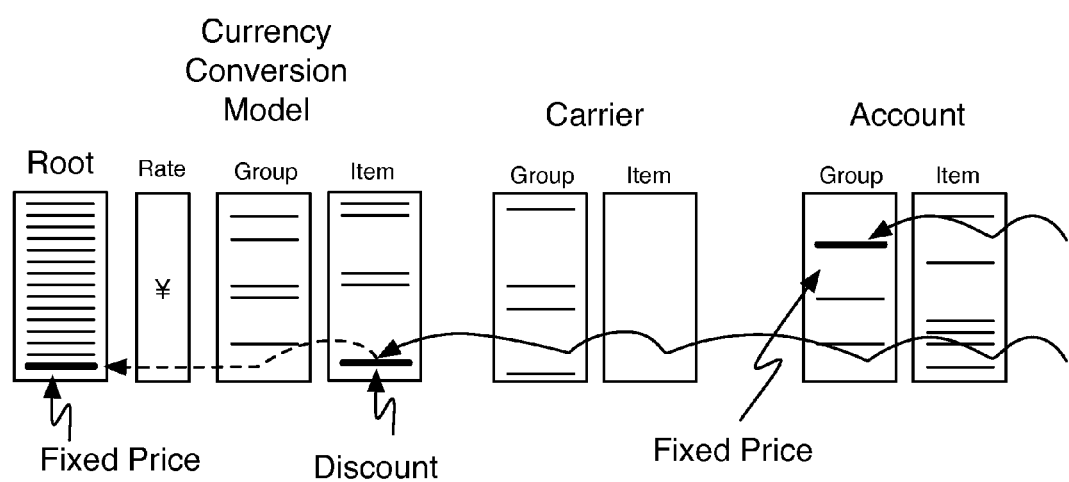
FIG. 9 is a schematic representation of resolving two exemplary billable item scenarios.

Block S140, which includes returning price of a billable item in a response functions to transmit a response to the query. The price is preferably returned according to a defined API of the pricing API. As mentioned above, checking a price preferably only involves checking the price of the communication and may not result in billing for the communication. The price can be used in augmenting the operation of the telephony service, returned to an outside application, or optionally used by a billing engine in calculating a bill. In one variation, the communication pricing query may specify several billable items in a batch query. Such a query can improve performance. In one variation, these may be optional communication options. If optional communication options, the pricing API may return the price of the cheapest one, the most expensive, the average price, or any suitable. In one variation, the price for the customer is returned. Additionally or alternatively, the cost to the telephony platform is returned. The cost could be obtained in a manner substantially similar to the price, where sparsely defined pricing models are procedurally processed to determine the cost. The cost may be beneficial to selecting routing options. In one variation, the routes may be selected to increase revenue (routing options with low cost and high price). In another variation, the price of the parent account may be returned as well as the price for the sub-account. This can be used by the billing engine to appropriately charge and credit the accounts. For example, an account may use the telecommunication platform to resell a service to sub-accounts. That service may generate revenue or subsidize the cost of communication. A billing engine can appropriately charge the account for the price owed to the communication platform As shown in FIG. 9, an exemplary pricing model can include a root model, currency conversion models, a carrier child model, and at least an account child model. A first exemplary request for pricing of a communication will be for an SMS message from endpoint A to endpoint B by application ABC. The account child model exists for application ABC, and thus application ABC includes customized pricing for billable items. Additionally, application ABC is a Japanese based application and so prices are set in yen. For this first exemplary request, the resulting billable item is checked in an item pricing model of the account child model (i.e., the application ABC pricing model). A pricing definition is not found. The pricing engine then proceeds to the next highest pricing model of the group pricing model of the account child model. In this case, a price definition exists for SMS message to a range of endpoints of which endpoint B is included. The price definition has two tiers a fixed price of ¥0.5 for the first 1000 by the account and ¥1 for messages beyond that. The pricing engine will read the message count for the account of application ABC, and since in this example they have sent over one thousand messages, the price is $0.01 for that message. This exemplary request illustrates the sparse overrides and the use of tiers in a pricing definition. In a second exemplary, request for pricing of a communication will be for a twenty minute voice call from endpoint A to endpoint C. The pricing engine does not identify an associated price definition in the account pricing model. Endpoint C happens to be an endpoint on Carrier X, which has a special pricing child model defined. A pricing definition is defined in the item pricing model of the Carrier X child model. The pricing model is a discount price of 10% off. Since this is a discount price definition, the pricing engine continues to resolve the price by checking in other pricing models. There is not a price definition in the group pricing model, and the currency pricing model doesn't include a pricing definition. The root pricing model does include a fixed price definition for voice calls of 20 minutes as $0.01 per minute. The conversion factor of the currency pricing model converts this to ¥1 which after the 10% discount is ¥0.9 per minute. This price is returned in the response.

The system and method of the preferred embodiment and variations thereof can be embodied and/or implemented at least in part as a machine configured to receive a computer-readable medium storing computer-readable instructions. The instructions are preferably executed by computer-executable components preferably integrated with the pricing engine and API of a communication platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for routing communication in a hardware communications platform system comprising: at the hardware communication platform system, the hardware communication platform system including:
   a telephony communication application programming interface (API) that processes programmatic interactions of an external system of a platform account holder with the communication platform system, the programmatic interactions including at least one of a programmatic interaction with a telephony voice service of the communication platform system and a programmatic interaction with a telephony messaging service of the communication platform system,
   the telephony voice service,
   the telephony messaging service,
   a pricing API that includes a price request interface to request a price for a billable item by using a pricing service and a pricing model interface to define a pricing model by using the pricing service, and
   the pricing service,
   at the pricing service, defining a hierarchical structure of pricing models for a set of billable items in the communication platform system which comprises:
      setting a root pricing model for the set of billable items within the communications platform system, and
      setting a set of pricing sub-models that sparsely override at least a portion of the root pricing model for a subset of the billable items in the communication platform system;
   at the telephony communication API, responsive to the communication API receiving a programmatic interaction from the external system of the platform account holder, the communication API interfacing with at least one of the telephony voice service and the telephony messaging service to process the programmatic interaction;
   at the pricing API, and during processing of the programmatic interaction, receiving a telephony communication pricing query, receiving the telephony communication pricing query comprising: in a case where the telephony voice service processes the programmatic interaction, receiving the telephony communication pricing query from the telephony voice service, and in a case where the telephony messaging service processes the programmatic interaction, receiving the telephony communication pricing query from the telephony messaging service;
   at the pricing service, and responsive to the pricing API receiving the communication pricing query, mapping the telephony communication pricing query to a billable item;
   at the pricing service, resolving a price of the billable item within a set of pricing models which comprises: identifying a first pricing model that most specifically applies to the billable item, and determining information of the billable item at least partially from the first pricing model;

responsive to the pricing service resolving the price, the pricing API returning the determined information of the billable item in a response to the communication pricing query, returning the determined information comprising: in a case where the telephony voice service provides the communication pricing query, the pricing API providing the response to the telephony voice service, and in a case where the telephony messaging service provides the communication pricing query, the pricing API providing the response to the telephony messaging service; and in a case where the pricing API provides the response to the telephony voice service, the telephony voice service selecting a routing option of a voice communication corresponding to the programmatic interaction received by the communication API based on the determined information included in the response from the pricing API; and in a case where the pricing API provides the response to the telephony messaging service, the telephony messaging service selecting a routing option of a messaging communication corresponding to the programmatic interaction received by the communication API based on the determined information included in the response from the pricing API, wherein at least one hardware server of the communication platform system provides the telephony communication API, wherein at least one hardware server of the communication platform system provides the telephony voice service, wherein at least one hardware server of the communication platform system provides the telephony messaging service, wherein the telephony communication pricing query specifies at least one communication routing option according to the programmatic interaction received from the external system of the platform account holder, wherein each communication routing option specifies at least one of a communication protocol and a carrier network according to the programmatic interaction received from the external system of the platform account holder, wherein the first pricing model corresponds to a usage plan of the platform account holder, the usage plan being selected responsive to a user-selection received at the external system of the platform account holder, and wherein the determined information includes at least pricing information of the billable item that is mapped to the telephony communication pricing query.

2. The method of claim 1, wherein setting a set of pricing sub-models comprises setting a first pricing sub-model for a group of billable items and setting a second pricing sub-model at a second instance through an administrator interface.

3. The method of claim 2, wherein the first pricing sub-model is set at a first instance and the second pricing model is set at the second instance that is substantially distinct from the first instance; and wherein the first and second pricing sub-models are set through an administrator interface.

4. The method of claim 3, wherein a billable item of the second pricing sub-model applies to a billable item of the group of billable items of the first pricing sub-model.

5. The method of claim 4, wherein resolving a price of a billable item comprises applying a discount rate of the second pricing sub-model to a specified price of the first pricing sub-model.

6. The method of claim 1, wherein the root pricing model is defined for a first currency; and wherein setting a set of pricing sub-models comprises setting a currency sub-model that defines a full set of billable items for a second currency.

7. The method of claim 6, wherein at least one currency sub-model defines a currency conversion factor applied to a root pricing model for billable items without pricing defined in the second currency.

8. The method of claim 1, wherein at least one billable item is defined by a specified telephony communication mode, a caller telephony communication endpoint, and a callee telephony communication endpoint.

9. The method of claim 1, wherein setting a set of pricing sub-models comprises setting at least one pricing sub-model with a fixed price, setting at least a second pricing sub-model with a discount applied to a parent pricing model, and at least a third pricing sub-model that defines a tiered pricing function that is dependent on usage.

10. A method for routing communication, the method comprising:

at a hardware telephony communication platform system, the hardware communication platform system including:

a telephony communication application programming interface (API) that processes programmatic interactions of an external system of a platform account holder with the communication platform system, the programmatic interactions including at least one of a programmatic interaction with a telephony voice service of the communication platform system and a programmatic interaction with a telephony messaging service of the communication platform system, the telephony voice service, the telephony messaging service, a pricing API that includes a price request interface to request a price for a billable item by using a pricing service and a pricing model interface to define a pricing model by using the pricing service, and the pricing service, at the communication API, responsive to the communication API receiving a programmatic interaction from the external system of the platform account holder, the communication API interfacing with at least one of the telephony voice service and the telephony messaging service to process the programmatic interaction;

at the pricing API, and during processing of the programmatic interaction, receiving a telephony communication pricing query, receiving the telephony communication pricing query comprising: in a case where the telephony voice service processes the programmatic interaction, receiving the telephony communication pricing query from the telephony voice service, and in a case where the telephony messaging service processes the programmatic interaction, receiving the telephony communication pricing query from the telephony messaging service;

at the pricing service, and responsive to the pricing API receiving the communication pricing query, mapping the telephony communication pricing query to a billable item;

at the pricing service, resolving a price of the billable item within a set of hierarchically defined pricing models with sparse overrides, wherein each pricing model is defined for a set of billable items; and responsive to the pricing service resolving the price, the pricing API returning the price of the billable item in a response to the communication pricing query, returning the price comprising: in a case where the telephony voice service provides the telephony communication pricing query, the pricing API providing the response to the telephony voice service, and in a case where the telephony messaging service provides the telephony communication pricing query, the pricing API providing the response to the telephony messaging service; and in a case where the pricing API provides the response to the telephony voice service, the telephony voice service selecting a routing option of a voice communication corresponding to the programmatic interaction received by the communication API based at least on the price include in the response from the pricing API; and in a case where the pricing API provides the response to the telephony messaging service, the telephony messaging service selecting a routing option of a messaging communication corresponding to the programmatic interaction received by the communication API based at least on the price include in the response from the pricing API, wherein at least one hardware server of the communication platform system provides the telephony communication API, wherein at least one hardware server of the communication platform system provides the telephony voice service, and wherein at least one hardware server of the communication platform system provides the telephony messaging service, wherein the telephony communication pricing query specifies at least one communication routing option according to the programmatic interaction received from the external system of the platform account holder, wherein each communication routing option specifies at least one of a communication protocol and a carrier network according to the programmatic interaction received from the external system of the platform account holder, and wherein the first pricing model corresponds to a usage plan of the platform account holder, the usage plan being selected responsive to a user-selection received at the external system of the platform account holder, and wherein the returned price of the billable item is associated with the selected usage plan.

11. The method of claim 10, wherein a billable item is defined at least in part by a telephony communication endpoint participating in a telephony communication.

12. The method of claim 10, wherein a billable item is defined at least in part by a telephony communication service usage during a telephony communication service.

13. The method of claim 10, wherein receiving a telephony communication pricing query occurs in response to accounting for usage of an account within the telephony communication platform system.

14. The method of claim 10, wherein mapping the telephony communication pricing query to a billable item comprises mapping a set of parameters, which includes a telephony communication mode, regional association of involved endpoints, and service association of involved endpoints, to a billable item.

15. The method of claim 10, further comprising defining a hierarchical structure of pricing models for a set of billable items in the telephony communication platform system.

16. The method of claim 15, wherein defining the hierarchical structure of pricing models comprises setting a root pricing model for the set of billable items within the telephony communications platform system and setting a set of pricing sub-models that sparsely over-ride at least a portion of the root pricing model for a subset of the billable items in the telephony communication platform system.

17. The method of claim 16, wherein the pricing models are mutable through an administrators interface, and wherein setting a set of pricing sub-models comprises setting a first sub-model over-rides a parent sub-model for set of billable items.

18. The method of claim 16, wherein setting a set of pricing sub-model comprises setting at least one pricing sub-model with a fixed price.

19. The method of claim 16, wherein setting a set of pricing sub-model comprises setting at least one pricing sub-model with a discount applied to a parent pricing model.

20. The method of claim 16, wherein setting a set of pricing sub-model comprises setting at least one pricing sub-model that defines a tiered pricing function that is dependent on usage.

21. The method of claim 16, wherein the root pricing model is defined for a first currency; and wherein setting a set of pricing sub-models comprises setting a currency root sub-model that defines a full set of billable items for a second currency.

22. The method of claim 21, wherein at least one currency root sub-model defines a currency conversion factor applied to a root pricing model for billable items without pricing defined in the second currency.

23. A hardware system for pricing in a communication platform comprising:

a telephony communication platform with a plurality of creditable items associated with account use of the platform, the communication platform including a telephony communication application programming interface (API) that processes programmatic interactions of an external system of a platform account holder with the communication platform, the programmatic interactions including at least one of a programmatic interaction with a telephony voice service of the communication platform and a programmatic interaction with a telephony messaging service of the communication platform;

a pricing application programming interface (API) that includes a price request interface to request a price for a creditable item by using a pricing engine, and a pricing model interface to define a pricing model by using the pricing engine;

a platform-pricing model that includes a set of root pricing models that define pricing for a full set of creditable items in the communication platform and a set of sub-models that override at least a portion of a root pricing sub-model and depend on at least one parent, and wherein each pricing sub-model includes dependency on at least a portion of the root pricing models; and the pricing engine, the pricing engine being configured to resolve a price from the platform-pricing model for a given creditable item, wherein responsive to the telephony communication API receiving a programmatic interaction from the external system of the platform account holder, the communication API interfaces with at least one of the telephony voice service and the telephony messaging service to process the programmatic interaction, wherein during processing of the programmatic interaction, the pricing API receives a telephony communication pricing query, receiving the telephony communication pricing query comprising: in a case where the telephony voice service processes the programmatic interaction, the pricing API receives the telephony communication pricing query from the telephony voice service, and in a case where the telephony messaging service processes the programmatic interaction, the pricing API receives the telephony communication pricing query from the telephony messaging service, wherein responsive to the pricing API receiving the communication pricing query, the pricing engine maps the telephony communication pricing query to a creditable item, wherein the pricing engine resolves a price of the creditable item within a set of pricing models which comprises: identifying a first pricing model that most specifically applies to the creditable item, and calculating a price at least partially from the first pricing model, wherein in a case where the pricing API provides the response to the telephony voice service, the telephony voice service selects a routing option of a voice communication corresponding to the programmatic interaction received by the communication API based on the response from the pricing API, and wherein in a case where the pricing API provides the response to the telephony messaging service, the telephony messaging service selecting a routing option of a messaging communication corresponding to the programmatic interaction received by the communication API based on the response from the pricing API wherein at least one hardware server of the communication platform system provides the telephony communication API, wherein at least one hardware server of the communication platform system provides the telephony voice service, and wherein at least one hardware server of the communication platform system provides the telephony messaging service, wherein the telephony communication pricing query specifies at least one communication routing option according to the programmatic interaction received from the external system of the platform account holder, wherein each communication routing option specifies at least one of a communication protocol and a carrier network according to the programmatic interaction received from the external system of the platform account holder, and wherein the first pricing model corresponds to a usage plan of the platform account holder, the usage plan being selected responsive to a user-selection received at the external system of the platform account holder, and wherein the returned price of the billable item is associated with the selected usage plan.

24. The system of claim 23, wherein the pricing model includes a set of currency sub-models that define a full set of billable items for a first currency.

* * * * *